INVENTOR.
RICHARD S. BURWEN
BY
Alfred W. Barber
ATTORNEY

INVENTOR.
RICHARD S BURWEN
BY
Alfred W. Barber
ATTORNEY

INVENTOR.
RICHARD S. BURWEN
BY
Alfred W. Barber
ATTORNEY

United States Patent Office 3,500,218

Patented Mar. 10, 1970

3,500,218

TRANSISTOR COMPLEMENTARY PAIR POWER AMPLIFIER WITH ACTIVE CURRENT LIMITING MEANS

Richard S. Burwen, Lexington, Mass., assignor to Analog Devices, Inc., Cambridge, Mass., a corporation of Massachusetts Filed June 1, 1967, Ser. No. 642,813
Int. Cl. H03f *3/04, 21/00*
U.S. Cl. 330—11 5 Claims

ABSTRACT OF THE DISCLOSURE

In a transistor power amplifier using a complementary pair of transistors, load current is limited by a second pair of transistors which sense the load current and clamp the input to the power transistors whenever the load current exceeds a predetermined level.

BACKGROUND OF THE INVENTION

Field of the invention

The present invention pertains to amplifiers; with semiconductor amplifying device (e.g. transistor); with semiconductor devices having different characteristics, including complementary types.

Description of the prior art

Prior to the present invention power amplifiers using complementary pair output transistors suffered from potential overheating and damage from excessive output current when the output load was too low or was shorted and/or when the output transistors were heavily driven. Current limiting resistors placed in series with these output transistors seriously limited the maximum power output.

SUMMARY

The present invention concerns current limiting method and means for complementary pair output transistors of a power amplifier. The preferred embodiment uses a pair of transistors connected to become active when the current drop across current sensing resistors in series with the transistors being protected becomes greater than a predetermined voltage. These protective transistors when activated by the detected excess current, shunt the bases of the output transistors so that drive to these transistors is limited and the output current is held to a predetermined safe value. This mode of protection is particularly useful under short circuit conditions since the maximum output current is automatically reduced as the load impedance is reduced.

Accordingly, one object of the present invention is to provide automatic limiting of the output current of a complementary pair of output transistors at reduced load impedances including short circuit while permitting full output current to flow to normal values of load resistance.

Another object is to provide such a protective circuit which is equally applicable to a complementary pair output circuit including Darlington drivers.

Still another object is to provide short circuit protection for a complementary pair output transistor circuit without substantially reducing the power output of such a pair under normal rated load conditions.

These and other objects of the present invention will be apparent from the detailed description of the invention given in connection with the various figures of the drawing.

DESCRIPTION OF THE PREFERRED EMBODIMENTS

Figure 1:
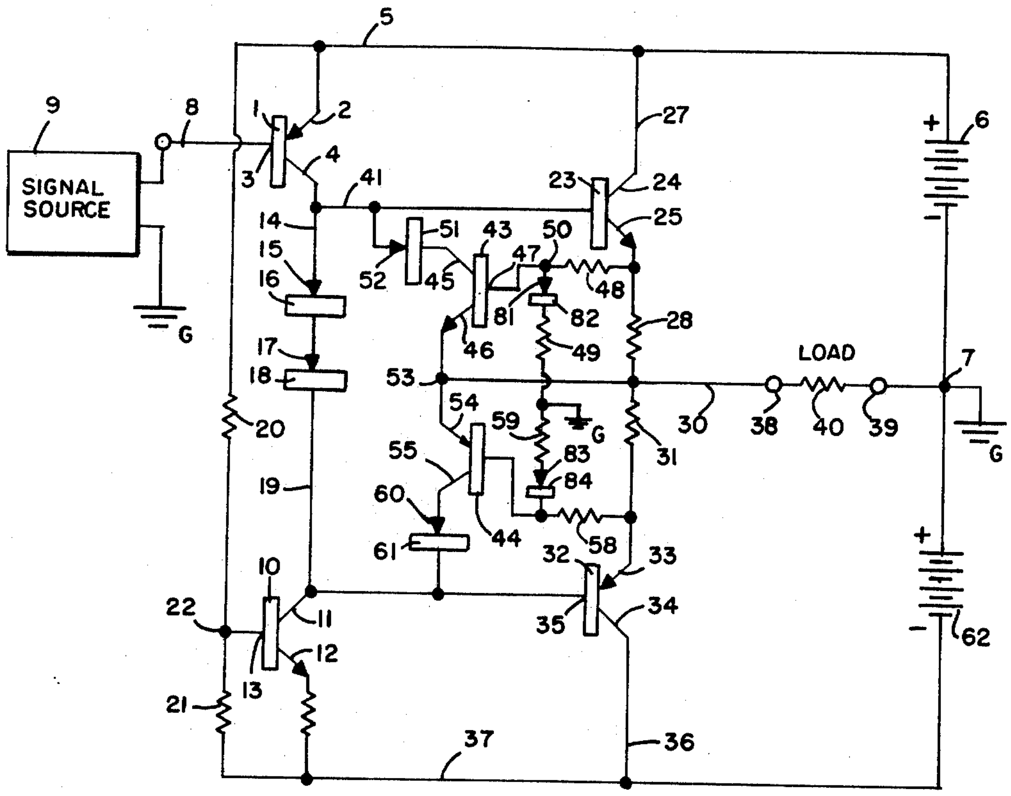
FIGURE 1 is a schematic circuit diagram of one form of the present invention.

FIGURE 1 shows an amplifier comprising a complementary pair of power output transistors driven by a second complementary pair. A third complementary pair of transistors is connected in such a manner as to limit the output current of the output pair. Output NPN power transistor 23 includes collector 24, emitter 25 and base 26 and output PNP power transistor 32 includes collector 34, emitter 33 and base 35. Collector 24 is connected over lead 27 to the positive side of a suitable positive bias source such as battery 6 and emitter 25 is connected through a resistor 28 and over lead 30 to load terminal 38. Collector 34 is connected over lead 36 to the negative side of a suitable negative bias source 62 and emitter 33 is connected through resistor 31 and over lead 30 to load terminal 38. Transistors 23 and 32 are driven by active PNP transistor 1 and current source NPN transistor 10. Transistor 1 includes emitter 2 returned to the positive side of bias source 6 through resistor 63 and over lead 5; collector 4 connected over lead 14 to diodes 15–16 and 17–18 connected in series in a forward conducting direction; and base 3 connected over lead 8 to a signal source 9. The other side of signal source 9 is connected over lead 65 to positive bias lead 5. Transistor 10 includes collector 11 connected over lead 19 to cathode 18 of diode 17–18; emitter 12 returned to the negative side of bias source 62 through resistor 64 and over lead 37; and base 13 connected to junction 22 between resistors 20 and 21 bridged from the positive side of bias source 6 to the negative side of bias source 62 so that transistor 10 acts as a constant current source. Base 26 is connected over lead 41 to collector 4 and base 35 is connected to collector 11. The drop across diodes 15–16 and 17–18 provides a forward bias to transistors 23 and 32 substantially eliminating cross-over distortion. Load terminal 39 is connected to ground G at junction point 7 as is the negative side of bias source 6 and the positive side of bias source 62. The circuit as described up to this point will be seen to be a power stage complementary pair and a driver stage with a constant current follower.

The present invention as shown in FIGURE 1 comprises NPN transistor 43, PNP transistor 44, diodes 51–52 and 61–60 together with interconnections with transistors 23 and 32 in such a way as to limit the current which can be drawn across load terminals 38 and 39 by load 40 which may be taken to include a short circuit of terminals 38 and 39. Transistor 43 includes collector 45 connected to cathode 51 of diode 51–52; emitter 46 connected to junction point 53 which is also connected to load terminal 38 over lead 30; and base 47 connected to junction point 50 between resistor 48 diode 81–82 in series with resistor 49. Resistors 48 and 49 are connected from the emitter end of resistor 28 to ground G neglecting the drop across diode 81–82 so that the voltage on base 47 is equal to:

$$(I_oR_{28}+E_o)R_{49}/(R_{48}+R_{49})$$

Where $I_o$ is the output current from transistor 23 and $E_o$ is the output voltage across terminals 38 and 39. Transistor 43 will conduct when the voltage from base to emitter of transistor 43 is greater than about 0.5 volt (assuming transistor 43 is a silicon transistor) shunting base 26 so that it cannot be driven any further and thereby limiting the output current from transistor 23.

Figure 2:
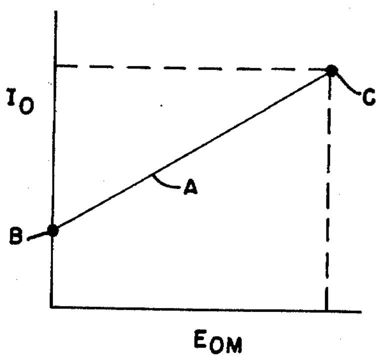
FIGURE 2 is a graphic representation of one mode of operation of the present invention.

FIGURE 2 shows how the output current is limited by this circuit. Output current $I_o$ is shown on the vertical scale plotted against maximum output voltage $E_{om}$ on the horizontal scale. Point C may be taken to represent the condition for any selected output voltage where current limiting starts and $I_o$ equals $(0.5+E_{om})$ $$R_{49}(R_{48}+R_{48})$$

divided by $R_{28}$ and point B represents short-circuit where $E_{om}$ is zero and the output current is limited to $0.5/R_{28}$. It will be seen from FIGURE 2 that the short-circuit current is only a fraction of the maximum current with a real value of load resistance. The short circuit current can be chosen to be any predetermined value by choosing $I_{max}=0.5/R_{28}$ or $R_{28}=0.5/I_{max}$. Diode 51–52 is connected between collector 45 and lead 41 to prevent any reverse bias from being applied to collector 45.

Going back to FIGURE 1 the second protective transistor 44 is coupled with output transistor 32 in the same way that transistor 43 is coupled with output transistor 23 and so limits the output current from transistor 32 in the same way. Transistor 44 includes collector 55 connected to anode 60 of diode 60–61 (anode 61 being connected to base 35); emitter 54 connected to junction 53 and over lead 30 to load terminal 38; and base 56 connected to the junction 57 between resistors 58 and 59 which in turn are connected from the emitter end of resistor 31 to ground G. The operation of transistor 44 in limiting the current of transistor 32 is completely analogous to the operation of transistor 43 in limiting the current of transistor 23 described in detail above. Diodes 81–82 and 83–84 may be included to open the circuit through resistors 49 and 59 respectively when the output current is below limiting levels. Diodes 51–52 and 60–61 are provided in series with collector 45 and emitter 55 respectively polled in such a direction as to conduct current for normal operation of transistors 43 and 44 but to prevent reverse bias from reaching these transistors as when reverse bias conditions exist in the circuit.

Figure 3:
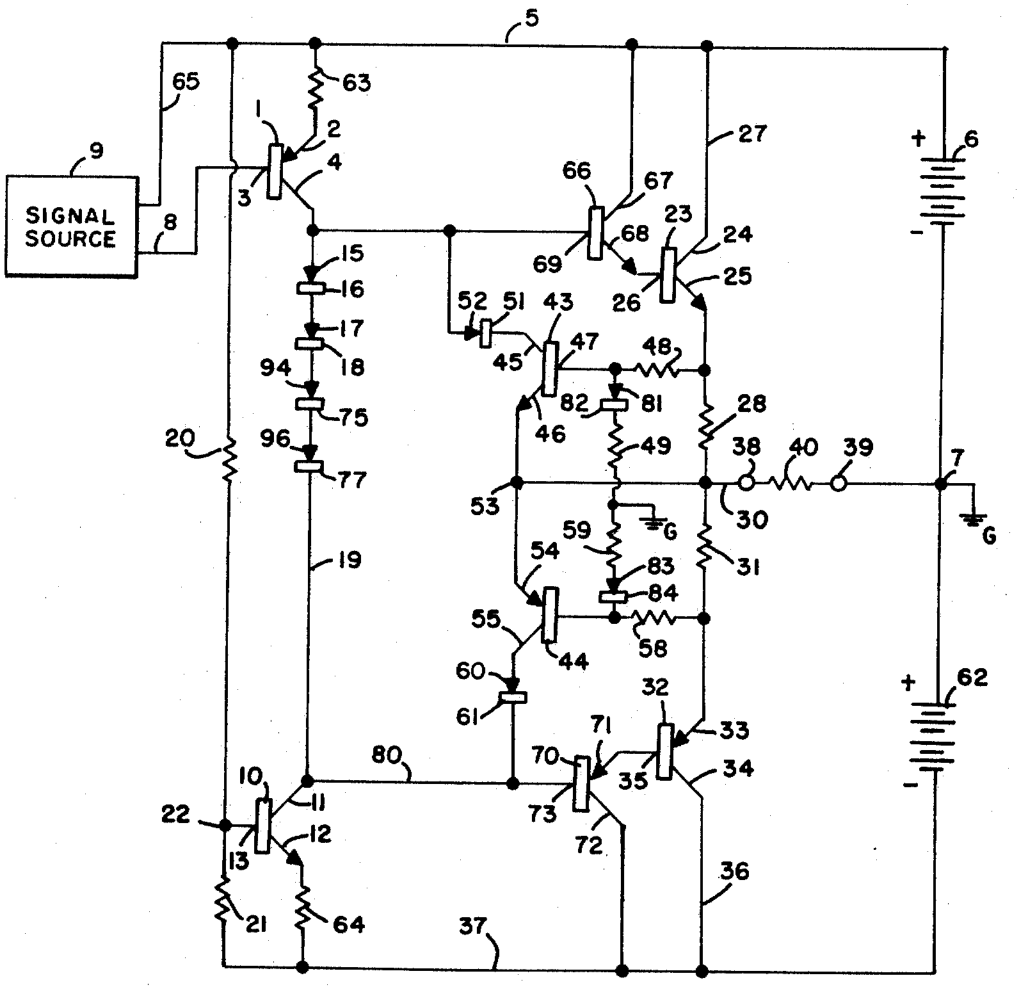
FIGURE 3 is a schematic circuit diagram of a form of the present invention using Darlington drive of the output transistors.
Figure 4:
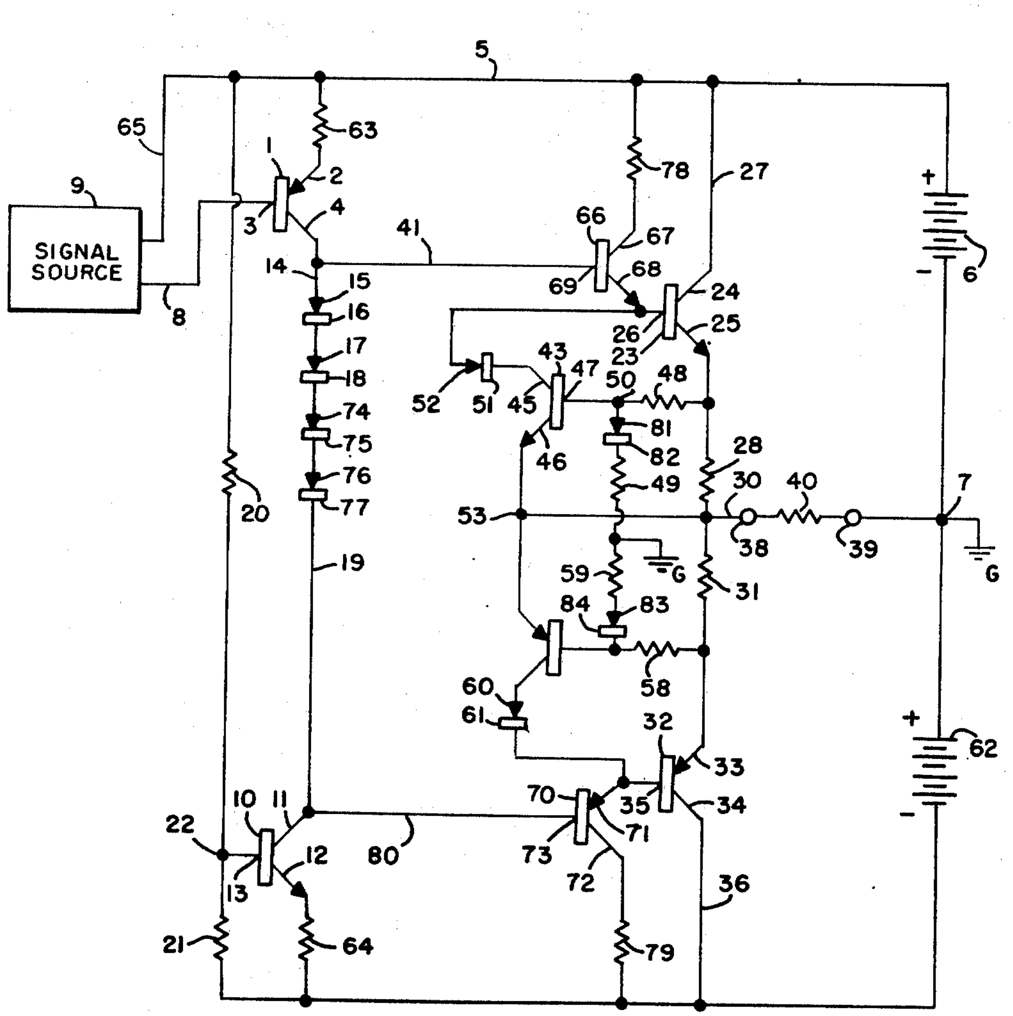
FIGURE 4 is a modification of the form of the invention shown in FIGURE 3.

The circuits of FIGURES 3 and 4 include Darlington driver stages for the output transistors 23 and 32. Circuit elements carrying the same numbers as in FIGURE 1 function as described above. In FIGURE 3 the Darlington connected transistors 66 and 70 have been added to the circuit of FIGURE 1 for providing added current sensitivity. Transistor 66 includes collector 67 connected to positive line 5, emitter 68 connected to base 26 and base 69 connected over lead 41 to collector 4. Transistor 70 includes collector 72 connected to negative line 37, emitter 71 connected to base 35 and base 73 connected over lead 80 to collector 11. These added transistors 66 and 70 provide increased gain in the circuit and the protective transistors 43 and 44 connected across bases 69 and 73 thus operate at lower level points in the circuit. Otherwise the operation is as described in detail above.

FIGURE 4 is an alternate connection of the protective transistors to the Darlington circuit with protective transistors 43 and 44 connected to bases 26 and 35. In this circuit resistors 78 and 79 are provided in series with collectors 67 and 72 respectively to limit the current to the protective transistors under severe drive and limiting conditions.

While only a few forms of the present invention have been shown and described many modifications will be apparent to those skilled in the art and within the spirit and scope of the invention as set forth in particular in the appended claims.

What is claimed is:

1. A transistor amplifier comprising;

a first NPN transistor including a collector, an emitter and a base;

a first PNP transistor including a collector, an emitter and a base;

a source of positive voltage and a source of negative voltage returned to a common reference point;

a direct connection between the collector of said first NPN transistor and said source of positive voltage;

a direct connection between the collector of said first PNP transistor and said source of negative voltage;

a first load terminal connected to said common point;

a second load terminal;

a load impedance connected between said two load terminals;

a first current sensing means connected between said second load terminal and the emitter of said first NPN transistor;

a second current sensing means connected between said second load terminal and the emitter of said first PNP transistor;

a second NPN transistor including a collector, an emitter and a base;

a second PNP transistor including a collector, an emitter and a base;

coupling means connected between the base of said second NPN transistor and the emitter of said first NPN transistor;

coupling means connected between the collector of said second NPN transistor and the base of said first NPN transistor;

coupling means connected between the base of said second PNP transistor and the emitter of said first PNP transistor;

coupling means connected between the collector of said second PNP transistor and the base of said first PNP transistor;

a return circuit connected between the emitters of said second NPN and PNP transistors and said second load terminal;

and differential input signal means coupled to the bases of said first NPN and PNP transistors;

whereby the current supplied to said second load terminal by said first NPN and PNP transistors is limited by the shunt impedance provided at the bases of said first NPN and PNP transistors by said second NPN and PNP transistors differentially responsive to current flowing in said first and second current sensing means.

2. A transistor amplifier as set forth in claim 1 wherein said couplings between the collectors of said second transistors and the bases of said first transistors include diodes for blocking reverse bias to said collectors.

3. A transistor amplifier as set forth in claim 1 wherein said coupling means between the bases of said second transistors and the emitters of said first transistors include voltage attenuating means returned to said common point.

4. A transistor amplifier as set forth in claim 1 wherein said input signal means includes two diodes connected in series between the bases of said first transistors for providing forward bias to said first transistors for substantially reducing crossover distortion in said first transistors.

5. A transistor amplifier as set forth in claim 1 wherein said coupling means connected between the collectors of said second transistors and the bases of said first transistors includes a transistor in Darlington connection with said first transistor.

References Cited

UNITED STATES PATENTS

| | | | |
|---|---|---|---|
| 3,375,455 | 3/1968 | Motta | 330—13 |
| 3,376,388 | 4/1968 | Reiffin | 330—13 X |
| 3,399,354 | 8/1968 | Sodtke | 330—13 |

NATHAN KAUFMAN, Primary Examiner

U.S. Cl. X.R.

330—13, 15, 17, 24, 26